(12) United States Patent
Cutler et al.

(10) Patent No.: US 7,458,543 B2
(45) Date of Patent: Dec. 2, 2008

(54) AERIAL REFUELING SYSTEM

(75) Inventors: Theron L. Cutler, Wichita, KS (US); Mark A. Shelly, Bel Aire, KS (US)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 11/313,190

(22) Filed: Dec. 20, 2005

(65) Prior Publication Data
US 2006/0278761 A1    Dec. 14, 2006

Related U.S. Application Data

(60) Provisional application No. 60/689,666, filed on Jun. 10, 2005.

(51) Int. Cl.
B64D 39/00    (2006.01)

(52) U.S. Cl. .................................................. 244/135 A

(58) Field of Classification Search ............. 244/135 A, 244/135 R, 135 C, 136; 137/899.2
See application file for complete search history.

(56) References Cited

U.S. PATENT DOCUMENTS

| | | | |
|---|---|---|---|
| 724,675 A | | 4/1903 | Decker |
| 2,475,635 A | | 7/1949 | Parsons |
| 2,557,438 A | * | 6/1951 | Johnson ..................... 137/256 |
| 2,668,066 A | | 2/1954 | Stadelhofer |
| 2,767,943 A | * | 10/1956 | Janney, II et al. ........ 244/135 A |
| 2,771,090 A | * | 11/1956 | Smith et al. ................. 137/390 |
| 2,823,880 A | | 2/1958 | Bergeson |
| 2,926,688 A | * | 3/1960 | Muma et al. ................ 137/263 |
| 3,008,674 A | * | 11/1961 | Abraham ............... 244/135 A |
| 3,169,667 A | * | 2/1965 | Headrick ...................... 222/23 |
| 3,181,899 A | | 5/1965 | McKnight |
| 3,275,061 A | * | 9/1966 | Williams et al. ............ 137/263 |

(Continued)

FOREIGN PATENT DOCUMENTS

DE    27744674    4/1979

(Continued)

OTHER PUBLICATIONS

"Air Force Technology—MRTT—Multirole Tanker Transport" Apr. 7, 2004, via internet archive http://web.archive.org/web/20040407041621/http://www.airforce-technology.com/projects/mrtt/.*

(Continued)

*Primary Examiner*—Michael R Mansen
*Assistant Examiner*—Joseph W Sanderson
(74) *Attorney, Agent, or Firm*—Harness, Dickey & Pierce, P.L.C.

(57) ABSTRACT

An aircraft aerial refueling system includes a fuel tank positioned in at least an aircraft wing to store fuel. At least two fuel pumps operate to transfer the fuel from the tank to a remotely located refueling connection. At least one electrically controlled valve provides each of an open position permitting fuel flow and a closed position isolating fuel flow between the tank and the refueling connection. A computer system automatically varies operation of any quantity of the fuel pumps and controls the electrically controlled valve between the open and closed positions during fuel transfer to the refueling connection. double wall fuel pipe manifolds in manned spaces of the aircraft.

5 Claims, 4 Drawing Sheets

U.S. PATENT DOCUMENTS

| | | | | |
|---|---|---|---|---|
| 3,279,522 | A * | 10/1966 | Norris et al. | 137/256 |
| 3,374,622 | A * | 3/1968 | Yates | 60/39.281 |
| 3,627,239 | A | 12/1971 | Hull, Jr. | |
| 3,669,136 | A | 6/1972 | Parenti | |
| 3,782,400 | A * | 1/1974 | Hardison et al. | 137/39 |
| 3,928,903 | A | 12/1975 | Richardson et al. | |
| 4,038,817 | A * | 8/1977 | Snow et al. | 60/204 |
| 4,149,739 | A | 4/1979 | Morris | |
| 4,591,115 | A * | 5/1986 | DeCarlo | 244/135 C |
| 4,609,169 | A | 9/1986 | Schweickert et al. | |
| 4,929,000 | A | 5/1990 | Annestedt, Sr. | |
| 4,932,609 | A * | 6/1990 | Secchiaroli et al. | 244/135 C |
| 5,141,178 | A | 8/1992 | Alden et al. | |
| 5,297,896 | A | 3/1994 | Webb | |
| 5,321,945 | A * | 6/1994 | Bell | 60/39.15 |
| 5,449,203 | A | 9/1995 | Sharp | |
| 5,449,204 | A | 9/1995 | Greene et al. | |
| 5,479,959 | A * | 1/1996 | Stotelmyer et al. | 137/559 |
| 5,573,206 | A | 11/1996 | Ward | |
| 5,660,358 | A * | 8/1997 | Grafwallner et al. | 244/135 R |
| 5,662,358 | A | 9/1997 | Lees et al. | |
| 5,785,276 | A | 7/1998 | Ruzicka | |
| 5,810,292 | A | 9/1998 | Garcia, Jr. et al. | |
| 5,906,336 | A | 5/1999 | Eckstein | |
| 5,996,939 | A | 12/1999 | Higgs et al. | |
| 6,089,252 | A * | 7/2000 | Braun | 137/263 |
| 6,302,448 | B1 | 10/2001 | Van Der Meer et al. | |
| 6,428,054 | B1 | 8/2002 | Zappa et al. | |
| 6,454,212 | B1 | 9/2002 | Bartov | |
| 6,467,725 | B1 | 10/2002 | Coles et al. | |
| 6,598,830 | B1 | 7/2003 | Ambrose et al. | |
| 6,601,800 | B2 | 8/2003 | Ollar | |
| 6,604,711 | B1 | 8/2003 | Stevens et al. | |
| 6,669,145 | B1 * | 12/2003 | Green | 244/135 A |
| 6,676,379 | B2 | 1/2004 | Eccles et al. | |
| 6,736,354 | B2 * | 5/2004 | Goto et al. | 244/135 C |
| 6,848,720 | B2 | 2/2005 | Carns et al. | |
| 6,889,940 | B1 | 5/2005 | Howe | |
| 6,913,228 | B2 * | 7/2005 | Lee et al. | 244/135 C |
| 6,966,525 | B1 * | 11/2005 | Schroeder | 244/135 A |
| 6,997,415 | B2 * | 2/2006 | Wozniak et al. | 244/135 C |
| 7,051,979 | B2 * | 5/2006 | Howe | 244/135 R |
| 2003/0038214 | A1 | 2/2003 | Bartov | |
| 2004/0026922 | A1 | 2/2004 | Carns et al. | |
| 2006/0202088 | A1 * | 9/2006 | Padan | 244/137.1 |

FOREIGN PATENT DOCUMENTS

| | | |
|---|---|---|
| DE | 10013751 | 10/2001 |
| EP | 0807577 | 11/1997 |
| EP | 1094001 | 4/2001 |
| EP | 1361156 | 11/2003 |
| FR | 2260742 | 9/1975 |
| FR | 2519723 | 7/1983 |
| GB | 374873 | 6/1932 |
| GB | 2257458 | 1/1993 |
| GB | 2298908 | 9/1996 |
| GB | 2373488 | 9/2002 |
| RU | 2111154 | 5/1998 |
| RU | 2140381 | 10/1999 |
| RU | 2142897 | 12/1999 |
| WO | WO 85/02003 | 5/1985 |
| WO | WO 91/06471 | 5/1991 |
| WO | WO 97/33792 | 9/1997 |
| WO | WO 98/07623 | 2/1998 |
| WO | WO 98/17938 | 4/1998 |
| WO | WO 02/24529 | 3/2002 |
| WO | WO 02/076826 | 10/2002 |
| WO | WO 03/102509 | 12/2003 |

OTHER PUBLICATIONS

"First A310 MRTT Completed" Schwarz, Karl, Jan. 10, 2004, Flug Revue Feb. 2004 http://www.flug-revue.rotor.com/frheft/FRHeft04/FRH0402/FRH0402d.htm.*

"Flug Revue Aircraft Gallery: Airbus A310 MRTT" Oct. 7, 2004, Flug Revue http://www.flug-revue.rotor.com/FRtypen/FRA310TT.htm.*

"Airbus Takes An Early Lead" May 25, 2004, Flight International http://www.flightglobal.com/Articles/2004/05/25/182069/Airbus+takes+an+early+lead.html.*

U.S. Appl. No. 10/857,226, Schroeder.
U.S. Appl. No. 10/890,664, Schroeder.
U.S. Appl. No. 10/896,584, Schroeder.
U.S. Appl. No. 11/067,331, Crangle.
U.S. Appl. No. 11/078,210, Smith.
U.S. Appl. No. 11/090,347, Speer.
U.S. Appl. No. 11/157,245, Takacs et al.
U.S. Appl. No. 11/217,696, Schuster et al.
U.S. Appl. No. 11/258,819, Cutler et al.
European Search Report, dated Oct. 16, 2006.
European Search Report, dated Oct. 17, 2006.
European Search Report, dated Oct. 31, 2006.
Flug Revue, "Airbus (Air Tanker) A330-200 Tanker", Jan. 26, 2004; www.flug-revue.rotor.com/FRTypen/FRA3302T.htm; Motorp-Presse Stuttgart, Bonn, German, (5 pgs).
Thales Avionics Ltd., "Air Tanker Bids for Future Strategic Tanker Aircraft", Jul. 3, 2001; www.thalesavionics.net/press/pr43.html; (3 pgs).
Wikipedia, the free encyclopedia, "Electroactive Polymers", http://en.wikipedia.org/wiki/Electroactive_polymers, last update Feb. 27, 2005 (2 pgs).
Keller, George R., "Hydraulic System Analysis", pp. 40-41, 1985, Hydraulics & Pneumatics, Cleveland, Ohio.

* cited by examiner

AERIAL REFUELING SYSTEM

CROSS-REFERENCE TO RELATED APPLICATIONS

This application claims the benefit of U.S. Provisional Application No. 60/689,666, filed on Jun. 10, 2005. The present application is generally related to subject matter disclosed in co-filed applications: "Shrouded Body Flow Meter Assembly," U.S. Provisional Application No. 60/689,677, filed on Jun. 10, 2005; "Shrouded Valve Apparatus And Related Methods," U.S. Utility application Ser.No. 11/150,853, filed on Jun. 10, 2005; "Fittings With Redundant Seals For Aircraft Fuel Lines, Fuel Tanks, And Other Systems," U.S. Utility application Ser. No. 11/301,131, filed on Dec. 12, 2005; "Systems And Methods For Reducing Surge Loads In Hose Assemblies, Including Aircraft Refueling Hose Assemblies," U.S. Utility application Ser. No. 11/258,819, filed on Oct. 26, 2005; "Adjustable Fittings For Attaching Support Members To Fluid Conduits, Including Aircraft Fuel Conduits, And Associated Systems And Methods," U.S. Utility application Ser. No. 11/440,726, filed on May 24, 2006; and "Tanker Aircraft Having Fluid Couplings With Spherical Joints And Associated Systems And Methods," U.S. Provisional Application No. 60/689,499, filed on Jun. 10, 2005. The disclosures of the above applications are incorporated herein by reference.

FIELD OF THE INVENTION

The present invention relates in general to refueling aircraft and more specifically to a refueling system functionally installable on a plurality of refueling aircraft platforms.

BACKGROUND OF THE INVENTION

Aircraft in flight are commonly refueled from a refueling aircraft. The refueling aircraft is typically provided with a boom mechanism or a flexible hose which trails behind the aircraft and physically makes a connection to the aircraft to be refueled. Common refueling aircraft have a plurality of wing fuel tanks and a central wing tank. Auxiliary fuel tanks can also be provided within or proximate to a fuselage of the aircraft. Fuel is commonly transferred to the boom or hose via a single wall header which is isolable by one or more shut-off valves. Common refueling systems include pumps to pressurize the fuel for transfer from one or more of the tanks, and valves which are controlled between an open and closed condition by simple on-off switches normally positioned on a refueling system panel and manually selected by a trained refueling operator.

Common refueling systems require the refueling operator within the refueling aircraft to visually monitor flow and pressure indicators and communicate to the receiving aircraft whose operator/pilot can monitor fuel tank levels. The refueling operator is responsible to manually initiate and shut down the flow of fuel. Inadvertent disconnect of the refueling boom or hose can therefore occur before the receiving aircraft receives a full fuel load if an excess number of fuel transfer pumps are operated or if a pressure spike occurs. Some systems provide automatic disconnect of the refueling boom or hose upon reaching a predetermined fuel over-pressure condition. Because of the use of manual monitoring and manual shut-off of fuel flow, operation of these refueling systems also can result in overfilling of the receiving aircraft fuel tanks and subsequent relief valve discharge of fuel.

SUMMARY OF THE INVENTION

According to one embodiment of an air refueling system of the present invention, a fuel tank is positioned in at least an aircraft wing to store fuel. At least two fuel pumps operate to transfer the fuel from the tank to a remotely located refueling connection. At least one electrically controlled valve provides each of an open position permitting fuel flow and a closed position isolating fuel flow between the tank and the refueling connection. A computer system automatically varies operation of any quantity of the fuel pumps and controls the electrically controlled valve between the open and closed positions during fuel transfer to the refueling connection.

According to another embodiment, the system further includes double wall fuel pipe manifolds in manned spaces of the aircraft. An outer wall of the manifolds contains fuel escaping due to a rupture in the inner wall. The cavity between the inner and outer walls is directed to un-manned spaces such as a fuel tank, or outside of a pressure hull of the aircraft.

According to still another embodiment, the computer system automatically operates a predetermined quantity of the pumps based on input of a predetermined aircraft type to be refueled. The system is further operable to open or close selected isolation valves and energize one or more of the pumps to automatically balance a fuel volume in each of a plurality of tanks of the aircraft, thereby controlling wing bending forces resulting from fuel in at least a fuel tank in each of the wings or a center of gravity of the aircraft. The computer system uses signals from each of a pressure transducer and a flow meter to determine when to energize selected pumps or when to open or shut selected valves.

According to yet a further embodiment, a method for operating an aircraft refueling system is provided.

The air refueling system of the present invention offers several advantages. A computer system automatically controls the selection and operation of any number of pumps during fuel transfer, eliminating the need to manually monitor fuel flow and pressure and manually adjust the number of operating pumps. Electrically operated valves are also provided which are automatically controlled by the computer system, for automatically isolating or opening one or more flow paths. The ability to manually control the loading of fuel or moving fuel between tanks using the pumps is also an advantageous feature of the air refueling system. Fuel can be directed to/from any tank individually or simultaneously. Reverse air refueling operation of the tanker aircraft can also be accomplished via manual control of valves and pumps while in receiver mode. Reverse air refueling through a boom of another aircraft can also be accomplished in receiver mode.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

It is initially noted that an aerial refueling system (ARS) of the present invention can be installed or backfitted into a plurality of refueling or tanker aircraft designs, including but not limited to the Boeing 767, Boeing 757, KC-135 and/or KC-10 aircraft. For exemplary purposes only, the present application refers in general to installation in the Boeing 767, including structure and equipment common to that aircraft.

Figure 1:
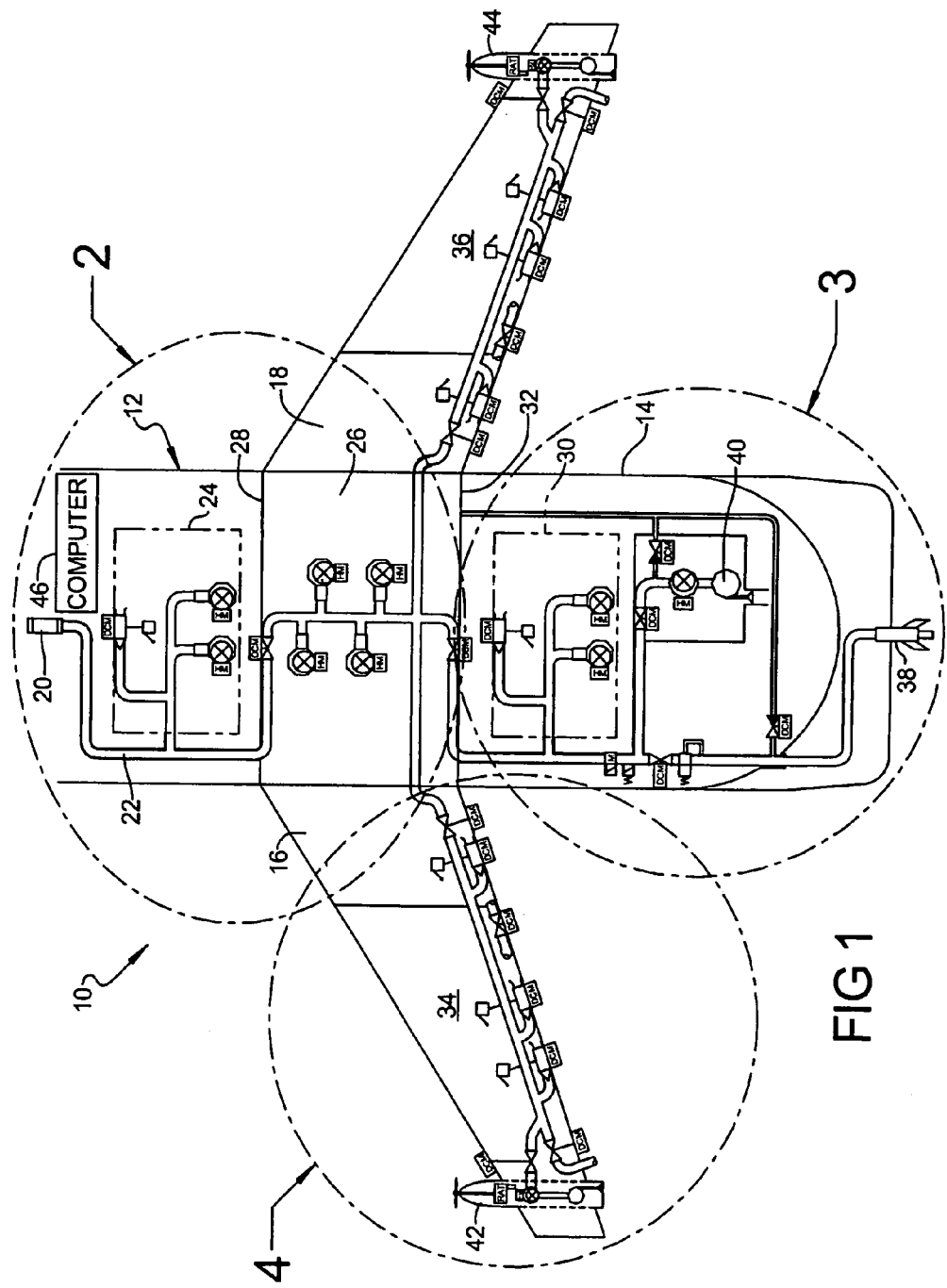
FIG. 1 is a plan view of an aircraft having an air refueling system of the present invention.

According to one preferred embodiment of the present invention and referring generally to FIG. 1, ARS 10 is mounted on a tanker aircraft 12 having a fuselage 14, a port wing 16 and a starboard wing 18. ARS 10 includes a receptacle 20 such as a universal aerial refueling receptacle slipway installation which can either receive or transfer fuel. Receptacle 20 is connected to a refueling manifold 22 which generally transfers fuel into or out of a plurality of tanks and directs the fuel to a refueling boom and/or each of a plurality of refueling hoses.

A plurality of fuel tanks are provided on tanker aircraft 12 including a forward auxiliary fuel tank 24, a center wing tank 26 separated by a front spar 28 from forward auxiliary fuel tank 24. A rear auxiliary fuel tank 30 is separated from center wing tank 26 by a rear spar 32. Each of the port and starboard wings 16, 18 include a port wing tank 34 and a starboard wing tank 36, respectively. Fuel from any of the tanks of tanker aircraft 12 can be transferred to a refueling boom 38, a refueling hose assembly 40, or one of a first or second wing mounted aerial refueling pod 42, 44.

ARS 10 further includes a computer system 46. Computer system 46 and associated software automatically direct the transfer of fuel from or into any of the fuel tanks and from or to any of the refueling boom 38, refueling hose assembly 40 and/or first or second wing mounted aerial refueling pods 42, 44. All valves and pumps associated with ARS 10 are also automatically controlled during normal operation using computer system 46. Computer system 46 therefore eliminates the need for manual control of any of the features of ARS 10 during normal fuel transfer.

For reference, refueling boom 38 is generally positioned and extendable from a rear of tanker aircraft 12, and receptacle 20 is generally positioned forward of port and starboard wings 16, 18. Forward and rear as used herein therefore refer generally to a forward end of tanker aircraft 12 and an aft end of tanker aircraft 12 respectively.

Figure 2:
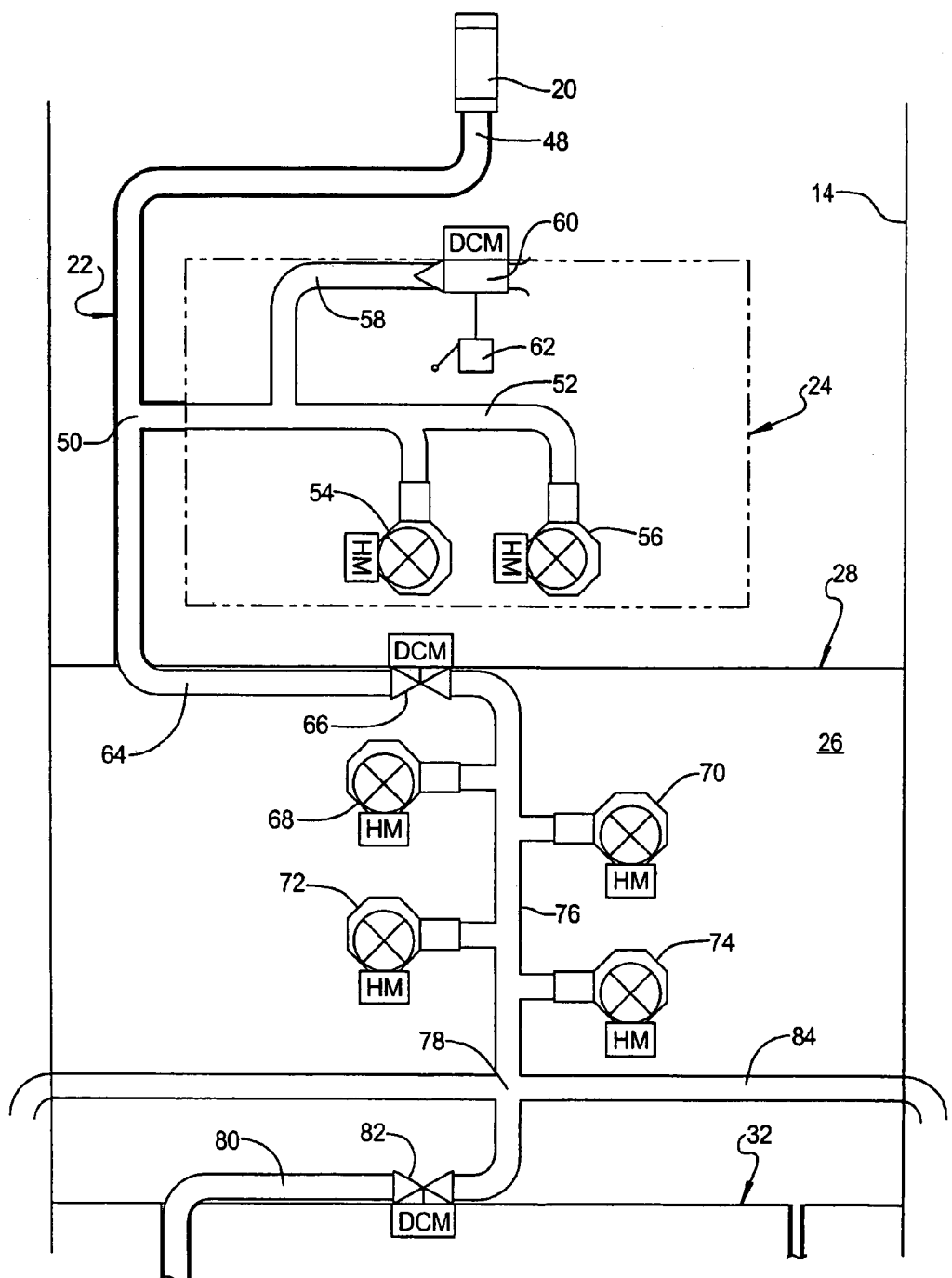
FIG. 2 is a plan view of the forward and central tank sections of the air refueling system shown in FIG. 1.

As best seen in reference to FIG. 2, a double-wall manifold 48 is connected to receptacle 20 forming part of refueling manifold 22. Double-wall manifold 48 extends rearward toward a tee 50. A single-wall manifold 52 extends from a double wall branch of tee 50 as double-wall manifold 48 enters forward auxiliary fuel tank 24. It is noted that double-wall manifolds are used in ARS 10 to preclude catastrophic rupture of a fuel line within a manned space of tanker aircraft 12 from disbursing fuel into the manned spaces. Generally, single wall manifolds or headers are used within tanks and in non-manned spaces of tanker aircraft 12 for ARS 10. Single-wall manifold 52 is connected to each of a first and second hydraulically driven pump 54, 56. Each of first and second hydraulically driven pumps 54, 56 are powered by a hydraulically driven motor. First and second hydraulically driven pumps 54, 56 are operated either singly or in unison to transfer fuel from forward auxiliary fuel tank 24 into refueling manifold 22. A branch header 58 connected to single-wall manifold 52 includes a normally closed DC motor operated isolation valve 60 having a float 62. Isolation valve 60 is provided to fill forward auxiliary fuel tank 24. Isolation valve 60 is normally controlled by computer system 46 to open or close. In the event that fuel in forward auxiliary fuel tank 24 reaches a predetermined level, float 62 is actuated by the level of fuel which mechanically shuts isolation valve 60, regardless of the electrical signal provided from computer system 46 to operate the DC motor of isolation valve 60. Float 62 therefore provides a mechanical override to ensure that forward auxiliary fuel tank 24 is not over-pressurized during filling operations.

As double-wall manifold 48 crosses front spar 28 it is converted to a single-wall manifold 64 within center wing tank 26. Any fuel which discharges from the inner wall of double-wall manifold 48 upon catastrophic rupture is therefore discharged into center wing tank 26. A normally open DC motor operated isolation valve 66 is provided immediately proximate to front spar 28 and within center wing tank 26, to isolate single-wall manifold 64.

Four hydraulically driven pumps are provided within center wing tank 26 which are used to pump fuel out of center wing tank 26. These include each of a third, fourth, fifth and sixth hydraulically driven pumps 68, 70, 72 and 74. Each of the pumps 68 through 74 discharge into a common header 76 which is also a single-wall header. Common header 76 connects via a connector 78 to each of a pump discharge header 80, isolated within center wing tank 26 by a normally open DC motor operated isolation valve 82, (similar to isolation valve 66) and a common wing tank connecting header 84. Common wing tank connecting header 84 permits flow between port and starboard wing tanks 34, 36 and center wing tank 26. Isolation valve 82 is positioned within center wing tank 26 and proximate to rear spar 32 to isolate pump discharge header 80.

Figure 3:
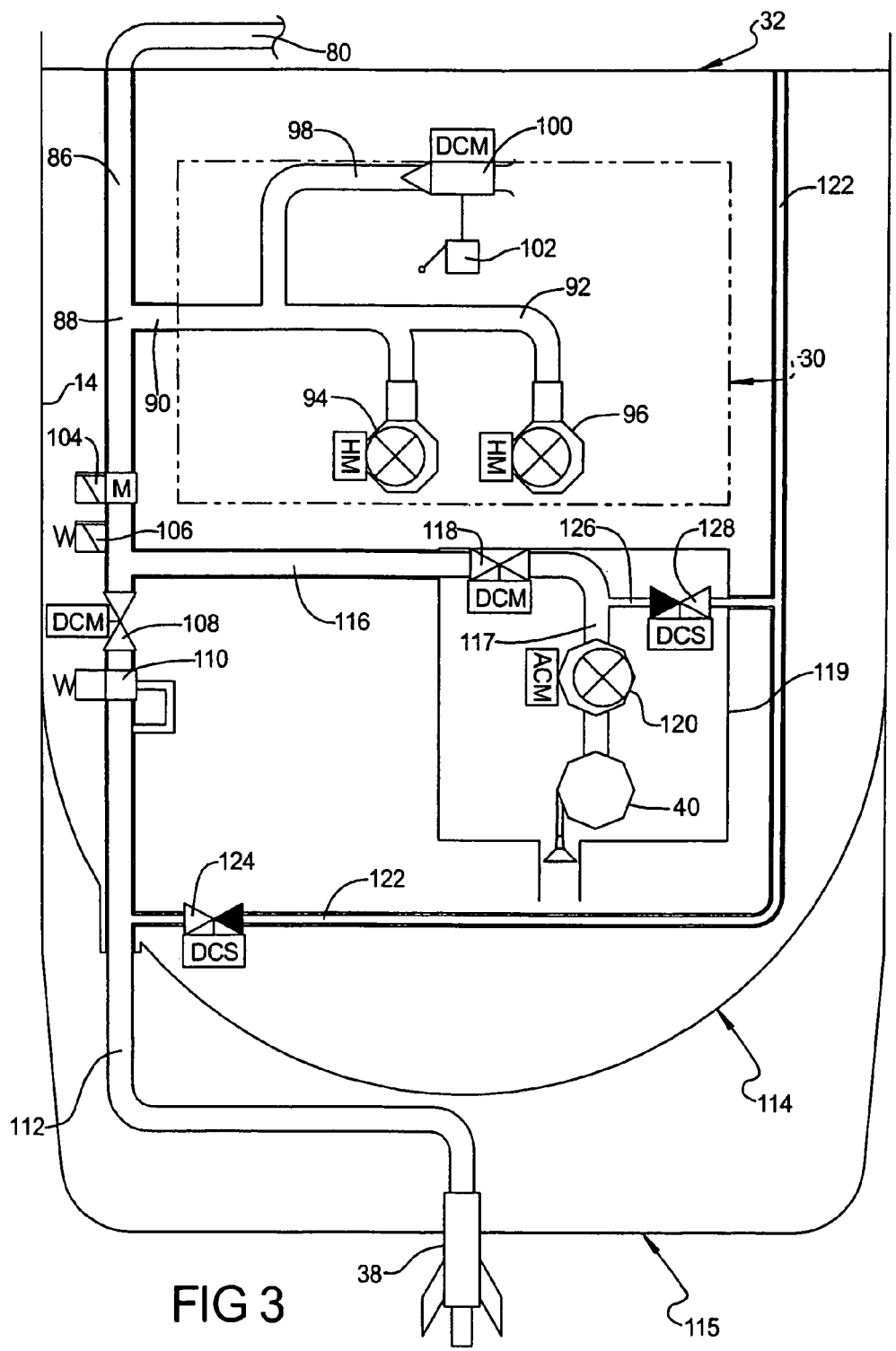
FIG. 3 is a is a plan view of the aft tank and fuselage sections of the air refueling system shown in FIG. 1.

Referring generally now to FIG. 3, where pump discharge header 80 passes through rear spar 32, pump discharge header 80 is converted to a double-wall manifold 86. A double-wall tee 88 is provided in double-wall manifold 86 having a double-wall branch 90 connected to rear auxiliary fuel tank 30. Within rear auxiliary fuel tank 30 double-wall branch 90 is converted to a single-wall header 92. Single-wall header 92 is connected to each of a seventh and an eighth hydraulically driven fuel pump 94, 96. Hydraulically driven pumps 94, 96 are similar in design and operation to each of hydraulically driven pumps 54, 56 and 68 through 74. Hydraulically driven pumps 94, 96 are used to discharge fuel from rear auxiliary fuel tank 30 into double-wall manifold 86 which forms a continuous flow path with refueling manifold 22. A branch header 98 is connected to single-wall header 92 and is isolated by a normally closed DC motor operated isolation valve 100. Isolation valve 100, similar to isolation valve 60, is used to fill rear auxiliary fuel tank 30. Also similar to isolation valve 60, isolation valve 100 is provided with a float 102 serving a similar function which will therefore not be further discussed.

From tee 88, double-wall manifold 86 further includes a fuel flow meter 104 and a pressure transducer 106. Fuel flow meter 104 is provided to electrically identify to computer system 46 the approximate flow rate of fuel through double-wall manifold 86. The output signal of fuel flow meter 104 is also used by computer system 46 to identify when additional ones of the hydraulically driven pumps in the appropriate tank are operated. An additional or second flow meter (not shown), similar to flow meter 104, can be positioned in double wall manifold 48 between tee 50 and 28 front spar 28 to improve flow measurement and determine a flow from forward auxiliary tank 24. Pressure transducer 106 is provided to identify a pressure differential with fuel flowing in double-wall manifold 86 whose electrical output signal can be used to close a normally open DC motor operated isolation valve 108. Pressure transducer 106 provides electrical signals to control the position of isolation valve 108 if pressure in a single-wall boom supply header 112 exceeds a predetermined value. A fuel pressure regulator 110 is also provided downstream of isolation valve 108. Pressure regulator 110 normally maintains a predetermined pressure in supply header 112.

With continued reference to FIG. 3, double-wall boom manifold 86 is converted to single-wall boom supply header 112 as double-wall boom manifold 86 passes through an aircraft pressure hull 114. Single-wall boom supply header 112 is connected to refueling boom 38 which is extended or retracted through aircraft outer aft skin 115 of tanker aircraft 12.

Between pressure transducer 106 and isolation valve 108, a double-wall manifold 116 branches off of double-wall manifold 86. Double-wall manifold 116 connects to a hose reel enclosure 119 which contains refueling hose assembly 40. Within the hose reel enclosure 119 a normally closed DC motor operated isolation valve 118 isolates a single-wall header 117 from double-wall manifold 116. A hose reel control motor 120 is used to operate refueling hose assembly 40 for extending or retracting the associated refueling hose.

Also provided within pressure hull 114 and connected to double-wall manifold 86 is a double-wall manifold 122 isolated by a normally closed DC solenoid operated isolation valve 124. Isolation valve 124 is opened by computer system 46 after operation of refueling boom 38. The purpose for double-wall manifold 122 and isolation valve 124 is to permit back flow of fuel to center wing tank 26 which is necessary when refueling boom 38, which is filled with fuel, is retracted into tanker aircraft 12. The excess volume of fuel within the boom supply header 112 is thereby allowed to flow back into center wing tank 26 through double-wall manifold 122. For similar purposes, a single-wall header 126 isolated by a normally closed DC solenoid operated isolation valve 128 is provided in hose reel enclosure 119 connected to single-wall header 117. When the hose of refueling hose assembly 40 is retracted, the excess fuel within the hose is allowed to transfer back through single wall header 117 and into double-wall manifold 122 toward center wing tank 26. Isolation valve 128 is therefore automatically opened by computer system 46 when refueling hose assembly 40 is retracted.

Figure 4:
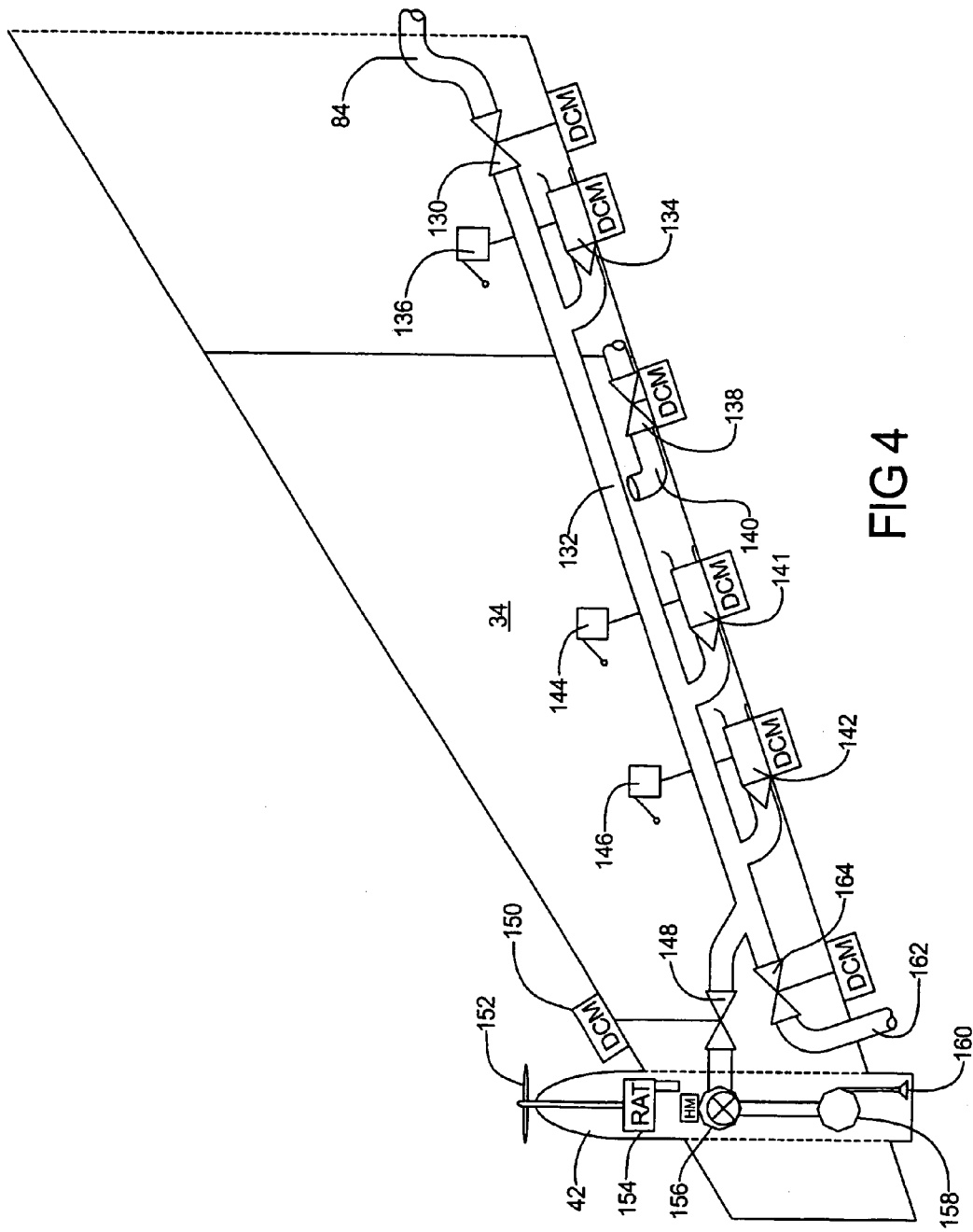
FIG. 4 is a plan view of the port wing of FIG. 1 showing exemplary wing system details for an aircraft refueling system of the present invention.

Referring generally now to FIG. 4, the portions of ARS 10 associated with port wing 16 are shown. Because the portions of ARS 10 associated with starboard wing 18 are a mirror image of port wing 16, only the details of port wing 16 will be discussed. From common wing tank connecting header 84 in center wing tank 26, a normally open DC motor operated isolation valve 130 is provided to isolate port wing tank 34 from center wing tank 26. A normally closed DC motor operated isolation valve 134 is provided within center wing tank 26, adjacent port wing tank 34, to provide fuel inlet flow to fill center wing tank 26. A float 136 similar in function to float 62 is provided to prevent over-filling center wing tank 26 by mechanically closing isolation valve 134. A normally closed, DC motor operated drain isolation valve 138 is provided within port wing tank 34 and connected to a fuel tank drain riser 140. Fuel in port wing tank 34 is drained by gravity flow via fuel tank drain riser 140 into center wing tank 26. Computer system 46 controls the open or shut position of isolation valve 138 (and its counter-part starboard wing tank isolation valve) to maintain a balanced volume of fuel in each of the port and starboard wing tanks 34, 36. Computations performed by computer system 46 are therefore used to determine the open or shut position of isolation valve 138.

A pair of first and second wing tank fill isolation valves 141, 142 are each normally closed, DC motor operated valves. First and second wing tank fill isolation valves 141, 142 are provided to fill port wing tank 34. A pair of valves is used for redundancy. First and second floats 144, 146 are provided for each of first and second wing tank fill isolation valves 141, 142 respectively, operating similar to float 62, to prevent overfill or over-pressurization of port wing tank 34. Each of first and second wing tank fill isolation valves 141, 142 are connected by piping into wing fuel manifold 132.

A normally closed fuel pod isolation valve 148 (and a similar counter-part in starboard wing tank 36) is provided to isolate first wing mounted aerial refueling pod 42 (or second wing mounted aerial refueling pod 44). Fuel pod isolation valve 148 is controlled by a DC motor 150 which in turn is controlled by computer system 46. Isolation valve 148 is opened when fuel is transferred using first wing mounted aerial refueling pod 42. First wing mounted aerial refueling pod 42 (and its counter-part second wing mounted aerial refueling pod 44 on starboard wing 18) each have a turbine 152 which rotates a ram air turbine assembly 154. Ram air turbine assembly 154 provides additional power to operate a hose reel motor 156 and also as necessary to boost the fluid pressure in the hose as it extends from a hose reel 158. A common refueling hose connector 160 is provided at a distal end of the hose extended by hose reel 158 to connect to an aircraft to be refueled.

In the event that tanker aircraft 12 needs to land before delivering its full load of fuel, fuel can be jettisoned to reduce the landing weight of tanker aircraft 12. A fuel jettison line 162 is therefore provided which is connected into wing fuel manifold 132 for discharging excess fuel during this operation. A normally closed DC motor operated isolation valve 164 is provided to permit fuel discharge via fuel jettison line 162. Isolation valve 164 is similarly controlled by computer system 46 and can also be manually selected (for example by a switch at a refueling panel, not shown) to open for this operation.

As noted herein, ARS 10 is capable of receiving a maximum fuel load from a KC-10, KC-135, or Boeing 767 Tanker Transport. A minimum on-load rate of 900 gpm is available using current air refueling procedures. ARS 10 uses a Universal Aerial Refueling Receptacle Slipway Installation (UARRSI), designated as receptacle 20, located on the fuselage 14. The five inch shrouded or double wall manifold 48 is routed from receptacle 20 to the ground refueling manifold inside the forward auxiliary tank 24.

The ability to manually control the loading of fuel or moving fuel between tanks using hydraulically driven pumps is an advantageous feature of ARS 10. Fuel can also be directed to/from any tank individually or simultaneously. Reverse air refueling operation of the tanker aircraft can also be accomplished via manual control of valves and pumps while in a "receiver mode". Reverse air refueling through a boom of another aircraft can also be accomplished in receiver mode. The wing isolation valves and fuel level control valves must be manually closed via ARS 10, meaning a switch for each of the valves is manually thrown to shut the valves, over-riding computer control of these valves. During reverse air refueling, the pumps must also be manually operated via ARS 10, meaning a switch for each of the pumps is manually thrown to actuate or shut off the pump, over-riding computer control of the pumps.

The gravity drain portion of ARS 10 allows fuel to be transferred between the main port and starboard wing tanks 34, 36 and the center wing tank 26. The 767 aircraft refueling system uses for example a 3 inch manifold penetrating a rib, and a line mounted butterfly valve to control the flow. An actuator for the line mounted butterfly valve is mounted on rear spar 32 using an ITT Corporation adapter and motor. A shaft with U-joints connects the adapter to the valve body. An upturned end of the manifold, fuel tank drain riser 140, which acts as a standpipe, limiting the amount of fuel that can be drained from any individual wing tank.

The wing isolation valve(s) 130 is a normally open valve that is closed in the event of a catastrophic failure of any portion of the wing fuel manifold 132. Isolation valve 130 is for example, a 3 inch valve installed in the wing fuel manifold 132 acting as a ground refuel/pod supply manifold. An actuator for isolation valve 130 (not shown) is mounted on the rear spar 32 also using an ITT Corporation adapter and DC motor. A shaft with U-joints connects the adapter to the valve body. The manifold provides support for the valve, thus no additional brackets are needed. The same three inch valve design is used in both gravity drain and wing isolation applications. This valve is commonly used in the same application (wing isolation) on the KC-135 refueling aircraft. The ITT adapter and motor is similar to that used on the 767 fuel jettison system.

A "core" ARS 10 refueling system includes the hydraulically driven refueling pumps and associated manifolds and valves. The placement of the center wing tank pumps 68-74 permit the center wing tank 26 to be pumped down to a reserve volume of approximately 600 gallons. The manifold sizes used are 3, 4 and 5 inch OD, and made for example of welded aluminum piping. The double-wall manifolds are disclosed in U.S. Pat. No. 6,848,720, commonly owned by the assignee of the present invention, the subject matter of which is incorporated herein by reference. The manifolds are typically attached to aircraft structure via tie rods and/or brackets. Exemplary manifold end connections are Wiggins AW2020 series, or similar designed flanged connections. The core system extends forward to where the receiver manifolds attach and aft to where the boom manifolds attach. The core system can also interconnect with a "green" aircraft ground refueling manifold.

The drain isolation valves 138 are installed in a span-wise beam. These valves permit a greater volume of fuel to flow to the center wing tank pumps than the aircraft structure would normally allow. Drain isolation valves 138 direct one-way flow toward the aft end of center wing tank 26 to preclude the fuel from loading the front spar 28 in a 9 g forward event.

The Universal Aerial Refueling Slipway Installation (UARRSI) or receptacle 20 is secured via tool located fasteners in a pressure box located in the upper part of the 767, in section 41. An electrical actuator (not shown) is installed aft of the receptacle pressure box and is connected to the receptacle. A seal (not shown) is installed on an actuator shaft where is passes through the pressure box. A manual override cable (not shown) is routed parallel to the manifold down to an access panel above where the manifold penetrates the main deck.

The receptacle 20 further includes both hydraulic and electrical systems. A drain tube is connected to the bottom of the pressure box and is routed to the lower lobe and connected to a drain mast. A pressure disconnect transducer (not shown) is installed in the manifold immediately down-stream of receptacle 20. ARS 10 also controls the disconnect transducer.

ARS 10 further permits tanker aircraft 12 to be refueled while in the air. An interconnect manifold installed as part of the core fuel system allows pressurized fuel to enter a separate ground refuel system from the ARS 10 system. This pressurized fuel can come from the receptacle 20 or from other tanks such as forward and/or rear auxiliary fuel tanks 24, 30 using the hydraulically driven pumps in the tanks.

Common header 76 is for example a 5 inch OD pipe which interfaces the core fuel system in the center wing tank 26. Common header 76 routes forward through the span-wise beams to the front spar isolation valve 66. Front spar isolation valve 66 is a 5 inch valve with an actuator installed on the front spar 28 outside the center wing tank 26. Common header 76 passes through the front spar 28 and becomes for example 5 inch shrouded or double-wall manifold 48. Double-wall manifold 48 traverses on the 767 aircraft to the left or port side of tanker aircraft 12 and turns forward and attaches to aircraft stanchions. Double-wall manifold 48 then routes through a lower cargo compartment along the stanchions until it reaches the electrical bay. Double-wall manifold 48 then passes through a fitting in the main deck floor and up into section 41. Double-wall manifold 48 then routes up a side of the fuselage 14 and traverses forward to the receptacle 20 and probe connections. Double-wall manifold 48 in section 41 is supported for example by tie rods.

When acting as a receiver system, ARS 10 also provides redundant shutoff capability to the existing fuel level control valves. The existing level control valves are replaced with new level control valves, identified as isolation valves 141, 142 that include provisions for attaching a pilot control line. Level control/isolation valves 141, 142 are otherwise identical to the existing valves in every other way. The pilot flow, which is normally returned to the associated port or starboard wing tank 34, 36 is routed to a pilot valve, identified as first and second floats 144, 146 via a control line. In flight, the first and second floats 144, 146 serve as a redundant shutoff for the fuel level control valves, isolation valves 141, 142. The pilot flow from each isolation valve 141, 142 is returned to its associated wing tank 34, 36 and operates normally as long as the first and/or second floats 144, 146 are open. Ground refueling orifice tubes (not shown) are also replaced with units previously designed for right hand fill optioned aircraft. This permits equal filling of port and starboard wing tanks 34, 36 in flight.

The first and second floats 144, 146 are installed at a level in port and starboard wing tanks 34, 36 above a two percent (2%) ullage space to prevent activation when tanker aircraft 12 is on the ground. In the event that the fuel quantity indication system (FQIS) does not shut off level control/isolation valves 141, 142, fuel will fill the port or starboard wing tank 34, 36 to the level of the first and/or second floats 144, 146. Fuel will then mechanically close first and/or second floats 144, 146 regardless of the electrical signal directing the position of level control/isolation valves 141,142.

ARS 10 incorporates a built-in test before each air refueling operation. The system uses a pre-check of a solenoid connected to a ground refuel manifold to direct fuel to the float line. The fill rate from the pre-check valve is higher than the drain rate of the float line causing the float to rise. This causes the fuel level control/isolation valve to close. ARS 10 detects the un-commanded valve closure thus confirming the redundant shutoff system is functional.

The wing portions of ARS 10 supply fuel to the wing mounted aerial refueling pods 42, 44. ARS 10 can also open an existing fuel jettison manifold. To supply fuel to either of the refueling pods 42, 44, fuel is pumped from the center wing tank 26 through common header 76 into the common wing tank connecting header 84 (part of the core fuel system).

An articulated duct allows movement between single wall boom supply header 112 and aircraft structure. Single wall boom supply header 112 then travels outside the skin, while inside a boom fairing, to a boom flexible interconnect and then to the boom 38 itself.

The solid state pressure transducer 106 is supplied for example by Kulite Semiconductor Corporation and is installed in the flow path of boom manifold 86. Fuel pressure regulator 110 is installed in boom manifold 86 aft of pressure transducer 106 and isolation valve 108. Fuel pressure regulator 110 is a mechanical device that limits the fluid pressure in refueling boom 38 to approximately 65 psig. Fuel pressure regulator 110 operates by sensing a differential pressure and uses this differential pressure to operate a flow control valve (not shown) positioned inside fuel pressure regulator 110.

ARS 10 also includes an aerial refueling leak detection system, which provides both active and passive fuel leak systems to mitigate failures. This system portion meets FAA regulations. The aerial refuel manifold leak detection system is an active, redundant system designed to provide the aircrew real-time detection of a contained catastrophic leak. The system also provides a passive leak detection system for pre and post flight ground checks of smaller leaks as well as troubleshooting.

For the active system, the refueling manifold 22 is double walled within the pressure vessel. Pressure activated switches (not shown) are installed on the outer manifold and react to pressure changes in interstitial spaces between the tubes of the double wall manifolds. A catastrophic leak of the inner manifold, caused by a ruptured tube or failed o-ring, causes the interstitial space to become pressurized during refueling operations. The switches are set to 30±5 psig. Pressures above this trigger the leak detection system. The outer manifold is also designed to operate at full system pressure. Each isolated section of the refueling manifold (four to six manifold sections) includes two switches for redundancy.

The passive portion of the leak detection system includes a series of drains (not shown) connected to the interstitial spaces in the refueling manifold. The drains are connected to the bottoms of each isolated section and run to overboard drains near the bottom of fuselage 14. These drains are checked pre and post flight. The drains have visual indicators at the manifolds to aid in trouble shooting if a leak is detected at the fuselage drains. Each isolated section of the refueling manifold 22 (four to six manifold sections) will drain at the lowest ground attitude point.

The ARS 10 system is separate from and can stand alone from the aircraft fuel system and may be operated at all stages of flight within the flight envelope. The ARS 10 operation is designed to reduce crew workload and makes mission controls and displays available to both pilots and the mission systems operator(s).

For example only, the 767 Tanker ARS 10 system is capable of the following performance:
Boom offload rates of 900 gallons per minute minimum at 50 psig continuously;
Centerline hose and drogue offload rates of 600 gallons minimum per minute at 50 psig continuously; and
Two wing mounted refueling pods offload simultaneously at rates of 400 gallons per minute minimum at 50 psig continuously.

System performance for other aircraft and modified 767 aircraft can vary from the values given above, depending on the piping size(s), pump characteristics, valve designs, and the like selected by the designer.

ARS 10 can operate any one or a combination including up to all four fuel pumps in center wing tank 26. A seven (7) second (maximum) delay is incorporated into the system between the start of each successive pump. Each pump has a three (3) second start-up time to minimize fuel pressure transient loads on both the tanker aircraft 12 and receiver fuel system. This is a mechanical limit and is not software controlled.

ARS 10 will command a pump on and wait up to seven seconds for an indication (via pressure switch on the pump). The next pump in line is then commanded on upon closure of the pressure switch which could be in as little as three (3) seconds. Should ARS 10 fail to receive a closed indication signal within seven seconds, the pump in question is flagged as failed and the next pump selected.

The ARS 10 system also selects an appropriate number of operating pumps for a specific aircraft to be refueled. The fuel off-load is sequenced to keep tanker aircraft 12 with a predetermined center of gravity (CG) envelope. The AR pumps and tank levels are controlled to preclude tanker aircraft 12 from being put into an out of CG condition during air refueling operations. The system architecture enables all aircraft fuel to be available for offload (except for reserve fuel) with no degradation to offload rate throughout the range of tanker fuel loads.

ARS 10 uses for example hydraulically driven Argo-Tech 6161-27 refueling pumps, four in center wing tank 26 to pump fuel from the center and wing mains and two in each of the auxiliary tank systems. A flame arrestor (not shown) is installed in the inlet to meet FAA requirements. ARS 10 commands the fuel pumps on only after a "contact made" signal is received. This signal is acquired from either the boom or from the pod/hose and drogue unit (HDU). The signal from the boom is sent as long as the boom is plugged into a receptacle. The signal from the pod or HDU is sent as long as the receiver is in the proper fuel range. Any time a contact made signal is lost, all of the fuel pumps are shut down. In the case of the Boom or HDU, the boom fuel return valve and manifold pressure relief valves also open.

The fuel pumps of the forward and rear auxiliary fuel tanks 24, 30 (body tanks) discharge directly to the refueling manifold 22. Fuel is therefore not dumped into center wing tank 26. Center wing tank fuel is also discharged directly to refueling manifold 22. Fuel from the wing tanks 34, 36 is gravity drained to the center wing tank 26 and then pumped into the refueling manifold 22. Fuel may be directed from the refueling manifold 22 into the common wing tank connecting header 84 from any tank (wing fuel still must be drained into the center tank first).

ARS 10 seeks to maintain a pressure of 60 psig downstream of the fuel pressure regulator 110 to limit surge pressures independent of the number of pumps required by a specific receiver type. If the pressure upstream of the fuel pressure regulator 110 exceeds 73 psig for 30 seconds, ARS 10 will shut down a fuel pump. ARS 10 will restart a pump only if the system pressure drops back below 50 psig for 30 seconds.

The gravity drain system allows fuel from the port and starboard wing tanks 34, 36 to be drained into the center wing tank 26. Stand pipes prevent the wings from being drained below a predetermined value. ARS 10 commands the gravity drain isolation valves open any time the required offload exceeds the fuel available in the center wing tank and the auxiliary tanks are empty. The system seeks to maintain an appropriate fuel volume in each wing tank to minimize wing bending loads.

The air refueling system of the present invention offers several advantages. A computer system automatically controls the selection and operation of any number of pumps during fuel transfer, eliminating the need to manually monitor fuel flow and pressure and manually adjust the number of operating pumps. Electrically operated valves are also provided which are automatically controlled by the computer system, for automatically isolating or opening one or more flow paths. The ability to manually control the loading of fuel or moving fuel between tanks using the pumps is also an advantageous feature of ARS 10. Fuel can be directed to/from any tank individually or simultaneously. Reverse air refueling operation of the tanker aircraft can also be accomplished via manual control of valves and pumps while in receiver mode. Reverse air refueling through a receptacle of another aircraft can also be accomplished in receiver mode.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An aircraft aerial refueling system, comprising:
    first and second auxiliary fuel tanks each operating to store a fuel;
    a main fuel tank;
    a refueling connection remotely located from the first and second auxiliary fuel tanks and the main fuel tank;
    at least two fuel pumps operating to transfer the fuel from one of the first and second auxiliary fuel tanks to the other of the auxiliary fuel tanks and from either of the first and second auxiliary fuel tanks to the main fuel tank and to a remotely located refueling connection;
    at least one electrically controlled valve operating to control flow of the fuel flow between the auxiliary fuel tanks and the refueling connection, the at least two fuel pumps of the first and second auxiliary fuel tanks operating using the at least one electrically controlled valve to discharge directly to a refueling manifold connected to the refueling connection without transfer of the fuel from the first and second auxiliary fuel tanks into the main fuel tank; and
    a computer system operating to automatically vary operation of the at least two fuel pumps and to control the electrically controlled valve between one of an open and a closed position during transfer of the fuel to the refueling connection, the computer system operating to totally automatically control the aircraft aerial refueling system to direct flow only between one of the first and second auxiliary fuel tanks and the refueling connection without fuel transfer through the main fuel tank.

2. The aircraft aerial refueling system of claim 1, wherein the refueling manifold interconnects each of the first and second auxiliary fuel tanks, the main fuel tank, the at least two fuel pumps, and the refueling connection.

3. An aerial refueling system for an aircraft, comprising:
    a center wing tank operating to store a volume of fuel, the center wing tank interconnected for fuel interchange to each of a port and a starboard wing tank;
    at least one auxiliary fuel tank operating to store a volume of fuel;
    a refueling connection remotely located from the center wing tank and the at least one auxiliary fuel tank;
    at least one fuel pump operating to transfer the fuel from the at least one auxiliary fuel tank to the remotely located refueling connection;
    at least one electrically controlled valve having each of an open position permitting fuel flow and a closed position isolating fuel flow between the auxiliary fuel tank and the refueling connection;
    a computer system operating to automatically vary operation of the at least one fuel pump and to control the at least one electrically controlled valve between one of the open and closed positions during transfer of the fuel to the refueling connection, the computer system operating to direct transfer of the fuel from the auxiliary fuel tank to the refueling connection without fuel transfer through the center wing tank or any of the port and starboard wing tanks;
    a hose of a refueling hose assembly; and
    an isolation valve automatically opened by the computer system when the refueling hose assembly is retracted to transfer an excess fuel within the hose back to the center wing tank.

4. The aircraft aerial refueling system of claim 3, further comprising a refueling manifold interconnecting each of the center wing tank, the at least one auxiliary fuel tank, the at least one fuel pump, and the refueling connection.

5. The aircraft aerial refueling system of claim 4, further comprising a common wing tank connecting header interconnecting the center wing tank and each of the port and a starboard wing tanks, the connecting header connected to the refueling manifold.

* * * * *